United States Patent
Kuether

[19]

[11] Patent Number: 6,108,516
[45] Date of Patent: Aug. 22, 2000

[54] REMOTE PROGRAMMER FOR A SATELLITE TELEVISION RECEIVER

[75] Inventor: David J. Kuether, Walnut, Calif.

[73] Assignee: Hughes Electronics Corporation, El Segundo, Calif.

[21] Appl. No.: 08/869,601

[22] Filed: Jun. 6, 1997

[51] Int. Cl.[7] .................................................. H04N 7/16
[52] U.S. Cl. .............................. 455/3.2; 348/10; 386/83
[58] Field of Search .................................. 348/934, 725, 348/906, 10, 11, 12, 13, 7, 6; 455/3.1, 4.1, 4.2, 5.1, 6.1, 6.2, 6.3; 386/83

[56] References Cited

U.S. PATENT DOCUMENTS

| | | | |
|---|---|---|---|
| 4,641,205 | 2/1987 | Beyers, Jr. | 358/335 |
| 4,843,482 | 6/1989 | Hegendorfer | 358/335 |
| 4,977,455 | 12/1990 | Young | 386/83 |
| 5,123,046 | 6/1992 | Levine | 380/10 |
| 5,151,789 | 9/1992 | Young | 358/194.1 |
| 5,307,173 | 4/1994 | Yuen et al. | 358/335 |
| 5,657,414 | 8/1997 | Lett et al. | 386/35 |
| 5,692,214 | 11/1997 | Levine | 395/833 |
| 5,852,478 | 12/1998 | Kwoh | 348/734 |
| 5,991,498 | 11/1999 | Young | 386/83 |

OTHER PUBLICATIONS

Excerpts—Owner's Manual VCR Plus+, VCR and Cable Instant Programmer, pp. 1–29 and attachment(s), Copyright 1990, 1992, Gemstar Development Corporation.

Excerpts—Owner's Manual, Toshiba, pp. 15–24 (date unknown).

Promotional Literature—RCA Digital Satellite Receiver Model DRD703RA, six pages, Copyright 1995, Thomson Consumer Electronics, Inc.

*Primary Examiner*—Chris Grant
*Attorney, Agent, or Firm*—John A. Crook; Michael W. Sales

[57] ABSTRACT

A remote programmer connectable to a satellite television receiver prompts a user to enter commands representing a satellite or local television program to be recorded by a video tape recorder. The remote programmer issues programming commands to the satellite television receiver and the video tape recorder to cause the program to be provided at the output of the receiver and recorded by the video tape recorder at a specified time.

7 Claims, 5 Drawing Sheets

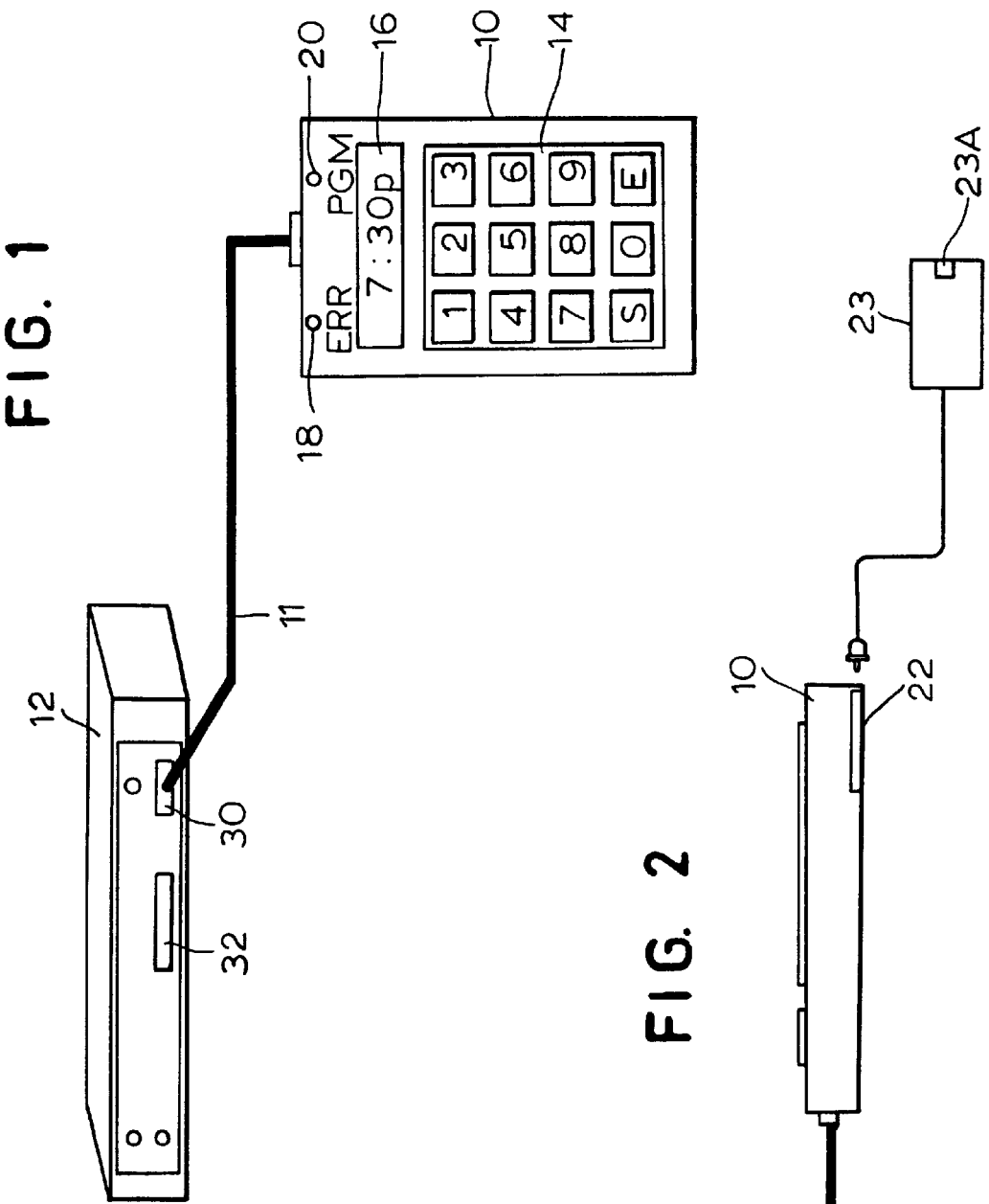

6,108,516

REMOTE PROGRAMMER FOR A SATELLITE TELEVISION RECEIVER

BACKGROUND OF THE INVENTION

1. Technical Field

The present invention relates generally to satellite television programming, and more particularly to an apparatus for programming a satellite television receiver and/or a video tape recorder (VTR).

2. Background Art

Satellite television programming has become widely available and has become a popular alternative to analog broadcast and cable services. The wide variety of programming available through digital satellite services renders it likely that programs will be shown at times that are not convenient for a viewer. This, in turn, results in the desirability of recording such programs for later viewing at a more convenient time.

Because satellite broadcast systems transmit digital data which cannot be directly used by NTSC standard television receivers, a decoder must be provided between the receiving dish and a user's television. This decoder takes the incoming data stream, demodulates and decodes the incoming data, and converts the data into analog form for use by a NTSC television receiver. Basic models of receivers and decoders, which are the most widely used, did not enable a user to command the satellite receiver to tune to a particular program at a certain time so that the program could be recorded (by a VTR) for viewing at a later time.

Advanced models of satellite receivers/decoders allow a user to program the receiver to record a program for later viewing. Such programmable receivers/decoders are commercially available from RCA, Sony, Toshiba and Uniden. In such receivers/decoders, the user selects the program to be recorded from an on-screen program guide and the receiver sends IR commands to a VTR to execute the recordings at the proper time. A user with a basic model receiver, however, would have to purchase and install a more expensive advanced receiver in order to use the programmable feature.

Thus, there remains a need for a unit which allows preprogrammed recording in basic model satellite receivers without the need to replace existing hardware.

SUMMARY OF THE INVENTION

According to one aspect of the present invention, a remote programmer for programming a satellite television receiver and a video tape recorder to record a select program comprises a communication link to the satellite television receiver and a communication link to the video tape recorder. The remote programmer further comprises means for prompting a user to enter programming information for the selected program and means responsive to the prompting means for accepting the programming information. The remote programmer further comprises means responsive to the accepting means for issuing programming commands to the satellite television receiver and the video tape recorder to cause the selected program to be output from the receiver and recorded by the video tape recorder.

In accordance with the present invention, the communication link to the satellite television receiver may be an interface cable connectable to a low speed data port or a wide band data port of the receiver. The communication link to the video tape recorder may be an infrared link comprising an infrared transmitter or a plug-in infrared adapter connectable to an infrared transmitter port. The remote programmer may also comprise means for requiring date and time information from the satellite television receiver and means for determining whether the selected program is a pay per view program.

According to another aspect of the present invention, a remote programmer for programming a satellite television receiver and video tape recorder comprises an interface connecting the remote programmer to the satellite television receiver, a processor, a display panel, and a command entry apparatus. The processor is programmed to operate the display panel to prompt a user to enter user commands via the command entry apparatus, and to accept user commands specifying a selected program and issue programming commands to the satellite television receiver via the interface to provide the selected program to a receiver output at a specified time. The remote programmer further comprises an infrared port linked with the video tape recorder for receiving signals from the processor to the cause the video tape recorder to record the selected program.

In accordance with the present invention, the processor may include a memory for storing the user commands and the command entry apparatus may comprise a keypad. The processor may be further programmed to develop a programming command for the satellite television receiver to turn on before the specified time and also to determine whether the selected program is a pay per view program. If the selected program is a pay per view program, the processor may be programmed to prompt a user to prebuy the selected program or to prompt a user to specify satellite television receiver configuration information and automatically purchase the selected program. The processor may be further programmed to determine whether the selected program is a satellite program or a local program and, if the selected program is a local program, to send a command to the satellite television receiver for local programming. Still further, the processor may be programmed to disable control of the satellite television receiver while the selected program is being recorded by the video tape recorder to prevent corruption of the recording.

BRIEF DESCRIPTION OF THE DRAWINGS

FIG. 1 is a diagrammatic view of a remote programmer according to the present invention in conjunction with a satellite television receiver;

FIG. 2 is a side elevational view of the remote programmer of FIG. 1;

DETAILED DESCRIPTION

Figure 3:
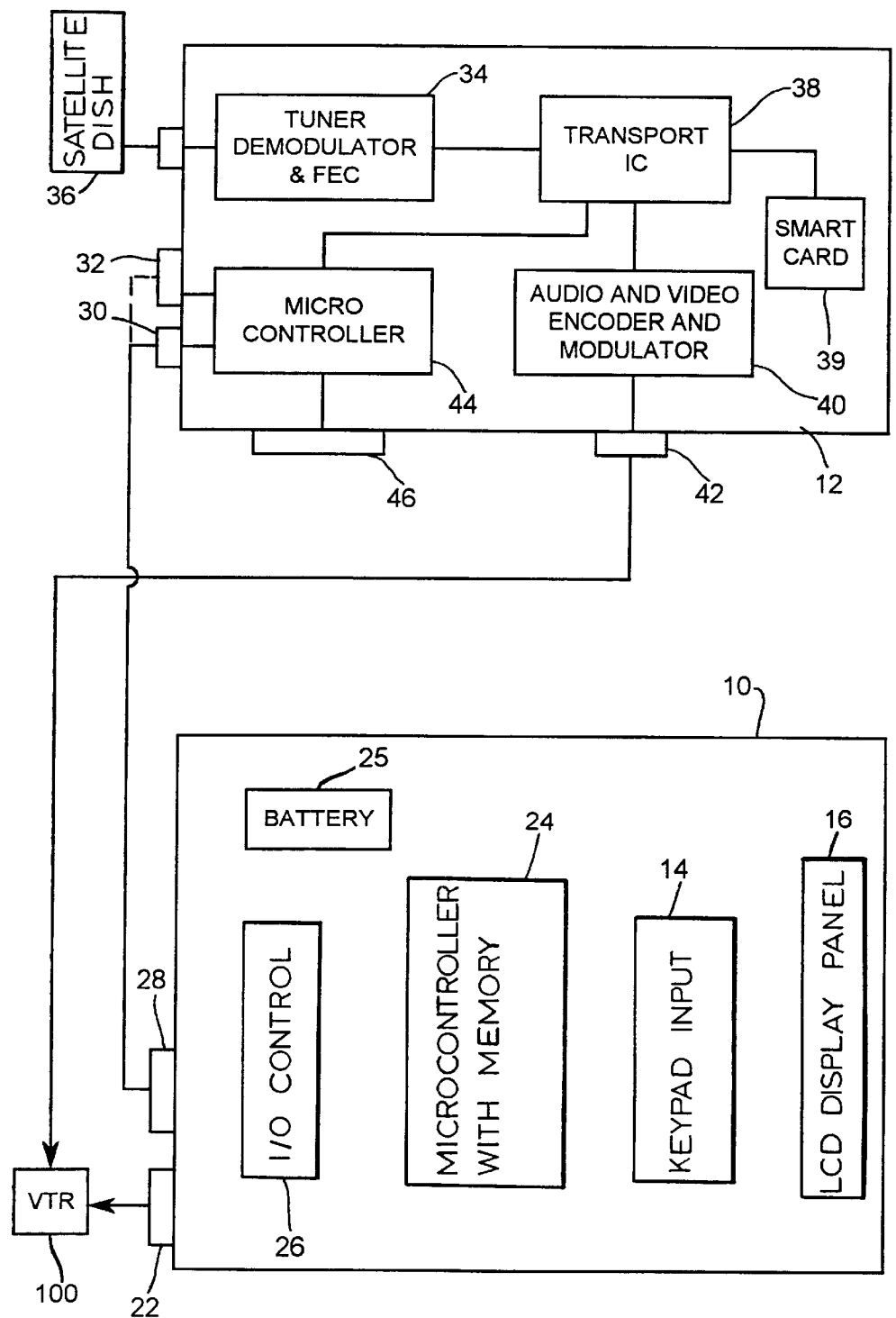
FIG. 3 comprises a block diagram of the remote programmer and satellite television receiver of FIG. 1.

Referring now to FIGS. 1–3, a remote programmer 10 is coupled by a cable 11 or through any other link (e.g., an infrared or radio link) to an integrated receiver decoder (IRD) unit 12 (also generally referred to as a satellite television receiver) which in turn receives digital signals from a satellite dish (not seen in FIG. 1). The remote programmer 10 includes a keypad 14 where a user can enter commands, a display panel 16 where a user can confirm commands and receive information and first and second indicator lamps 18, 20 or other indicators informing a user of the status of the programmer 10. As seen specifically in FIG. 2, the programmer 10 further includes an infrared port 22 which can be used to issue commands to a video tape recorder (VTR) 100 as noted in greater detail hereinafter. An optional infrared adaptor 23 which plugs into the infrared port 22 of the programmer 10 may also be included to issue commands to the VTR 100 as also noted in detail hereinafter. A battery 25 supplies power to the various components.

FIG. 3 illustrates the main elements of the programmer 10 and the IRD 12 in greater detail. The remote programmer 10 includes a processor in the form of a microcontroller 24 having internal memory, an input/output (I/O) control 26 and an I/O port 28 which is in turn connected to a low speed data port 30 of the IRD 12. Alternatively, as indicated by the dashed lines, the I/O port 28 may be connected to a wide band data port 32 of the IRD 12.

The IRD 12 includes a tuner, demodulator and forward error correction unit 34 which receives the data provided by the satellite dish 36. The output of the unit 34 contains several time division multiplexed programs. A transport integrated circuit (IC) 38 linked to a "smart card" or conditional access module (CAM) 39 demultiplexes the incoming data stream and applies conditional access and decryption algorithms to the data. Data from a single television program is thereby isolated and transmitted to an audio and video encoder and modulator 40 which develops analog RF/audio/video signals at an output 42.

The IRD 12 further includes a microcontroller 44 which is coupled to the data ports 30 and 32 and is further coupled to a keyboard port 46, which may receive commands from a keyboard (not shown). The microcontroller 44 controls the transport IC 38 in the fashion noted in greater detail hereinafter.

Figure 4A:
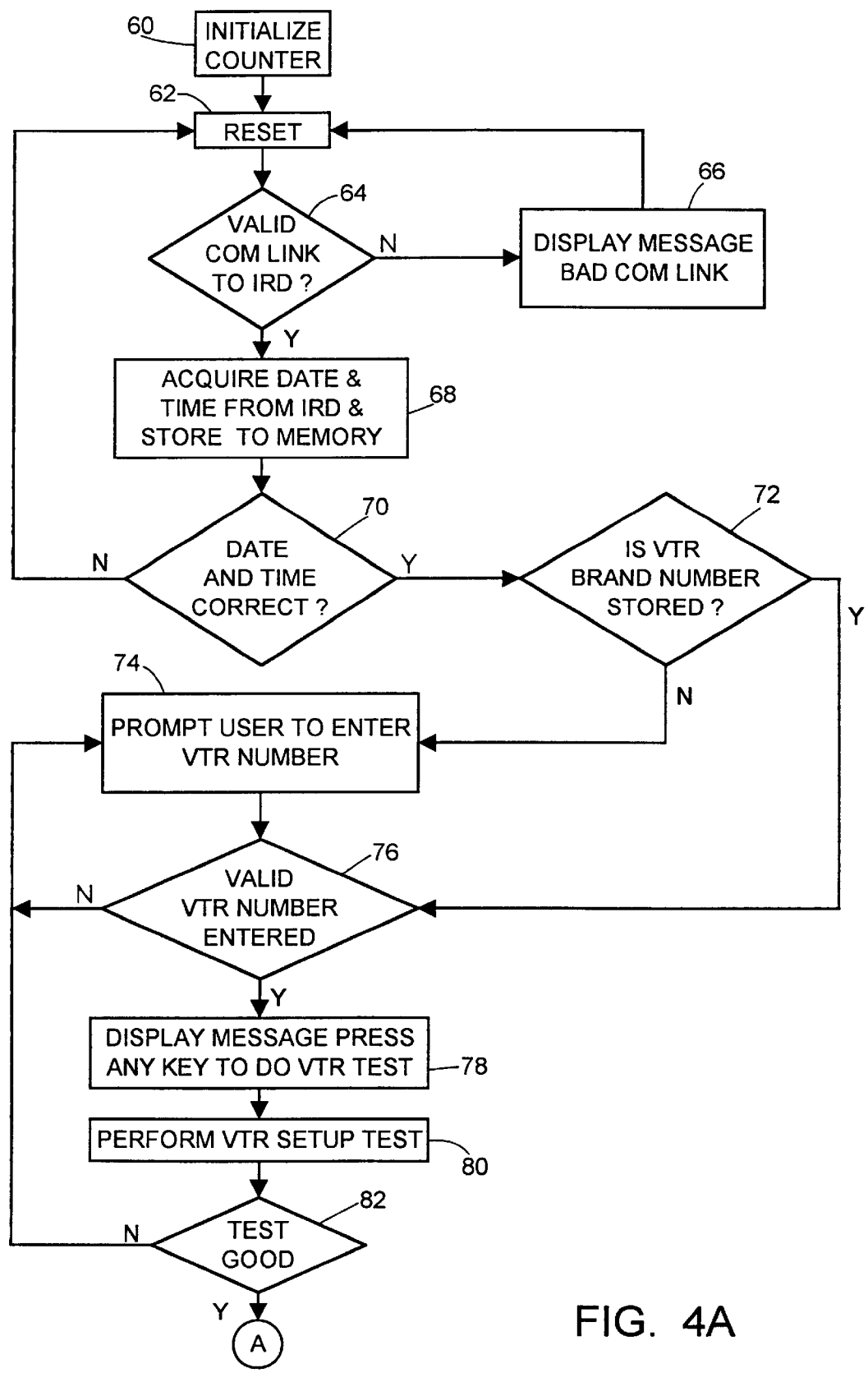
FIGS. 4A and 4B, when joined along the similarly lettered line, together comprise a flowchart of programming executed by the micro controller of the remote programmer of FIG. 3.
Figure 4B:
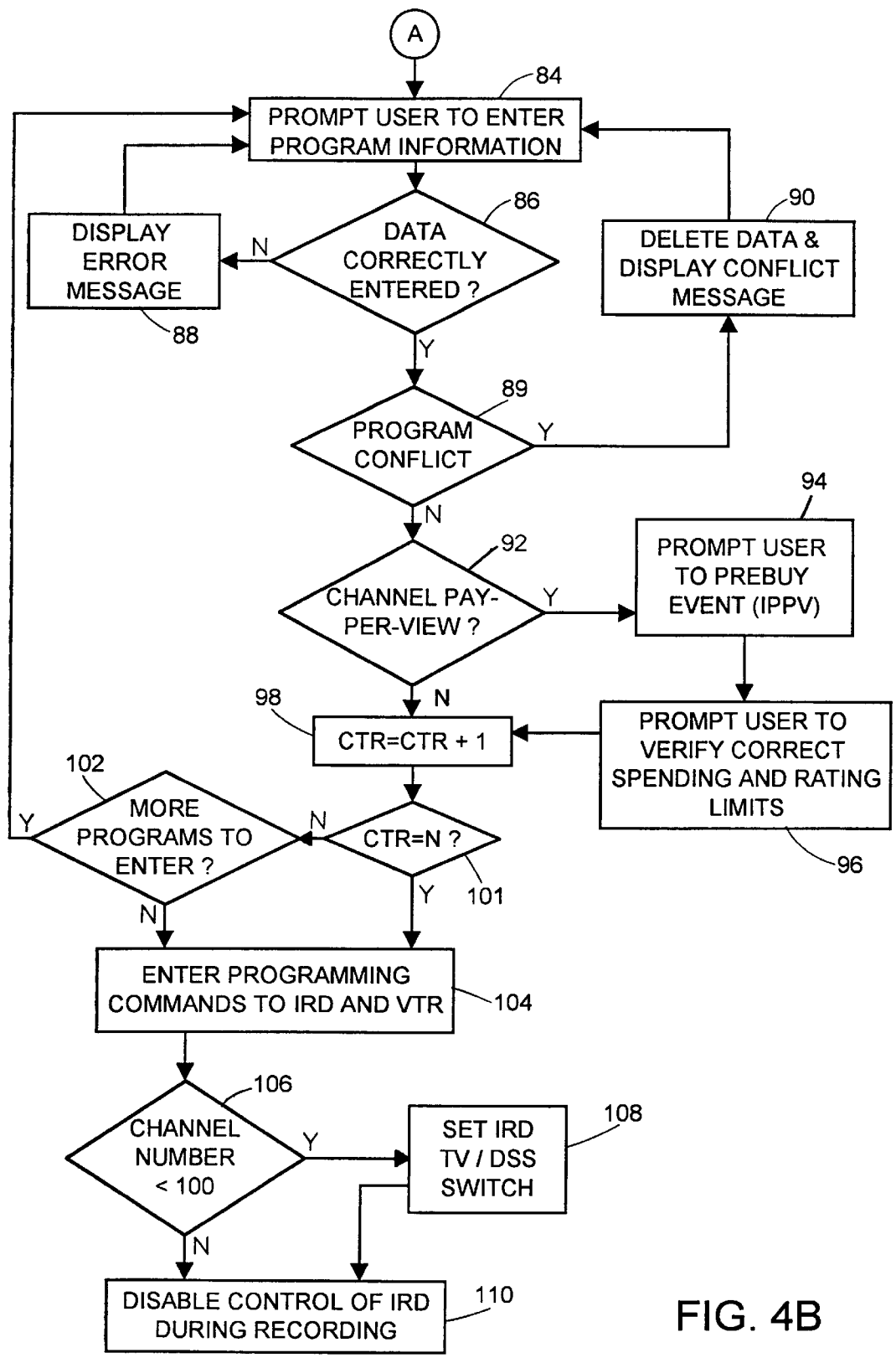

FIGS. 4A and 4B illustrate programming executed by the microcontroller 24 of the remote programmer 10. Programming begins at a block 60 which initializes a program counter CTR, which will be used to keep track of how may programs are stored in the memory of the microcontroller 24. The counter, for example, may initially be set to 1. A block 62 then resets the remote programmer to begin programming instructions. Alternatively, the block 62 may prompt a user to press a predetermined key on the keypad 14 of the remote programmer 10 to reset the programmer. The reset key would allow the user to reset the programmer at any time.

A block 64 then checks to determine whether a valid communications link has been established between the remote programmer 10 and the IRD 12. The remote programmer 10, for example, may send a command to the IRD 12 to verify the connection. The IRD 12, upon receiving this prompt, will send an acknowledgement back to the remote programmer 10. If the remote programmer 10 does not receive such an acknowledgement (indicating no valid communication link), a block 66 operates the display panel 16 to display a message advising the user of the faulty or non-existent communication link and control returns to the block 62 to reset the remote programmer. The error indicator lamp 18 on the remote programmer may also be energized. The verification of the communication link between the remote programmer 10 and the IRD 12 may be performed automatically whenever a user begins programming with the remote programmer 10. A test button on the remote programmer may also be pressed by the user to perform the same function.

On the other hand, if a valid communication link has been established between the remote programmer 10 and the IRD 12, a block 68 acquires the current date and time from the microcontroller 44 of the IRD 12 via one of the ports 30 or 32 and the I/O port 28. The current date and time is stored in the memory of the microcontroller 24 of the remote programmer 10 and may also be displayed on the display panel 16, if desired. Optionally, a block 70 may then verify whether the date and time stored in the memory of the remote programmer 10 is correct. If not, control returns to the block 62 which resets the remote programmer. An error message may also be displayed on the display panel 16 and/or the error indicator lamp 18 may be energized.

Alternatively, if the block 70 verifies that the date and time are correct, a block 72 determines whether an identifying brand number for the VTR 100 is stored in the memory of the microcontroller 24. If not, a block 74 prompts the user to enter such number using the keypad 14. After the user enters a VTR brand number or, alternatively, if the block 72 determines that a number was previously stored, a block 76 determines whether the number is valid (i.e. corresponds to a known VTR brand). If not, control returns to the block 74 to prompt the user to enter a new number. If the VTR brand number is valid, a block 78 displays a message on the display panel 16 to prompt a user to press any key on the keypad 14 to begin a VTR test. A block 80 then performs a VTR setup test. If a block 82 determines that the test fails, control returns to the block 74 to prompt the user to enter a new VTR brand number. An error message could also be displayed on the display panel 16.

Alternatively, if the block 82 determines the VTR setup is correct, a block 84 (FIG. 4B) prompts the user via the display panel 16 to enter desired program information. This information includes, for example, the date and starting time of the desired program, the channel on which the program will be shown, the duration of the program and an indication as to whether the program occurs daily, weekly, or is a one time event. During this time, the programming indicator lamp 20 (FIG. 1) on the remote programmer 10 may be energized to indicate that programming is taking place.

A block 86 then checks to determine whether the programming information data has been correctly entered and, if not, a block 88 displays an error message and control returns to the block 84 to prompt the user to reenter the programming information. The block 88 may also indicate an invalid entry at any time by energization of the error indicator lamp 18 on the remote programmer or via the display panel 16.

Otherwise, control passes to a block 89 which checks to determine whether the user has entered data resulting in a program conflict. This may occur, for example, where the user has requested two television programs which will be simultaneously broadcast. If such program conflict is detected, a block 90 deletes the data that was just entered and which created the conflict from the memory of the microcontroller 24 and the display panel 16 is operated to display a message advising the user of the conflict. Control then returns to the block 84 to prompt the user to reenter programming information.

Alternatively, if the block 89 determines that there is no program conflict, a block 92 determines whether the program entered is a pay-per-view (PPV) program. In many satellite systems, for example, channels 101–199 are designated PPV channels. Thus, the block 92 may determine whether a program is a PPV program by determining whether the requested channel is between 101 and 199. If yes, a block 94 prompts the user (via the display panel 16) to pre-buy the requested PPV program. The user may pre-buy the desired PPV program by manually performing an Impulse Pay Per View (IPPV) wherein the program is purchased before the scheduled airing time. Alternatively, as discussed below in connection with FIG. 5, the remote programmer 10 could automatically purchase the PPV program at the scheduled recording time.

Many satellite television systems include a "lock" feature, which prevents access to various features of the system through use of a four-digit password called the "key." The lock feature, for example, allows a user to control ratings levels (i.e. G, PG, PG13, R, NR, Adult etc.) such that when the system is locked, programs rated higher than the set limit cannot be purchased. The lock may also include spending limits (which prevents purchase of programs over a set amount), a channel lock (which prevents viewing of selected channels) and/or a PPV lock (which prevents purchase of any PPV programs). These locks could prevent successful recording of a requested program. Thus, a block 96 also prompts a user to check correct spending, rating and channel limits and, if necessary, to "unlock" the system.

A block 98 then increments the program counter CTR (which was initialized by the block 60) by one, indicating that programming of a program was successful. A block 101 then determines whether the counter is equal to the maximum number ("N") of programs that can be stored by the remote programmer. If not, a block 102 inquires (via the display panel 16) whether the user wishes to enter any additional programs. If yes, control returns to the block 84, which prompts the user to enter the programming information for the next program.

Control remains with the loop consisting of the blocks 84–102 until all television programs have been entered. Thereafter, control passes from the block 102 to a block 104 which downloads the programming commands from the remote programmer 10 to the IRD 12 and the VTR 100.

Referring again to FIGS. 1–3, the remote programmer 10 may communicate with the VTR 100 via infrared signals from the infrared port 22 of the remote programmer 10. If desired, any other communication link may be established between the remote programmer 10 and the VTR 100, such as a hard-wired connection, a radio frequency connection, or the like. If an infrared link is used, the remote programmer 10 may prompt the user to position the remote programmer 10 relative to the VTR 100 to provide direct line-of-sight between the infrared port 22 and an infrared port on the VTR 100. However, an optional infrared adaptor 23 which plugs into the programmer 10 may be incorporated to eliminate the need for positioning the remote programmer 10 close to the VTR 100. The infrared adaptor 23 includes a LED 23a on one end which may be aligned with the VTR 100.

The remote programmer 10 is capable of instructing the microcontroller 44 to turn on and turn off the IRD 12 at appropriate times to permit decoding of desired programming. Preferably, turn on occurs at a time just before presentation of the desired television programming, with sufficient time given to allow the remote programmer 10 to set up the VTR 100 using the infrared port 22.

Referring again to FIG. 4B, after the block 104 downloads the programming commands to the IRD 12 and the VTR 100, a block 106 determines whether a channel requested for recording is a satellite channel or a local off-air channel. This may be determined, for example, by checking whether the requested channel is below 100, which channel numbers are generally designated for local off-air programming. The IRD 12 includes a TV/DSS button that may be toggled to specify satellite or local off-air programming. Thus, if the block 106 determines that the requested channel is a local channel, a block 108 sends a command to the IRD 12 to toggle the TV/DSS switch to local off-air programming. The blocks 106–108 enable the user to use the remote programmer 10 for both satellite and off-air channels rather than having to separately program the VTR 100 to record local off-air channels.

Actual recording of a stored program may be corrupted, for example, if a user inadvertently disables the IRD 12 or switches channels during recording. To prevent such inadvertent corruption of recording, a block 110 may disable control of the IRD 12 during actual recording of a stored program. This may be accomplished, for example, by disabling the keyboard port 46, which receives commands for the IRD. After recording was complete, the block 110 would "unlock" control of the IRD 12. The remote programmer 10 may also allow a user to abort the recording and unlock control of the IRD by, for example, depressing two predefined keys on the keypad 14 simultaneously.

Figure 5:
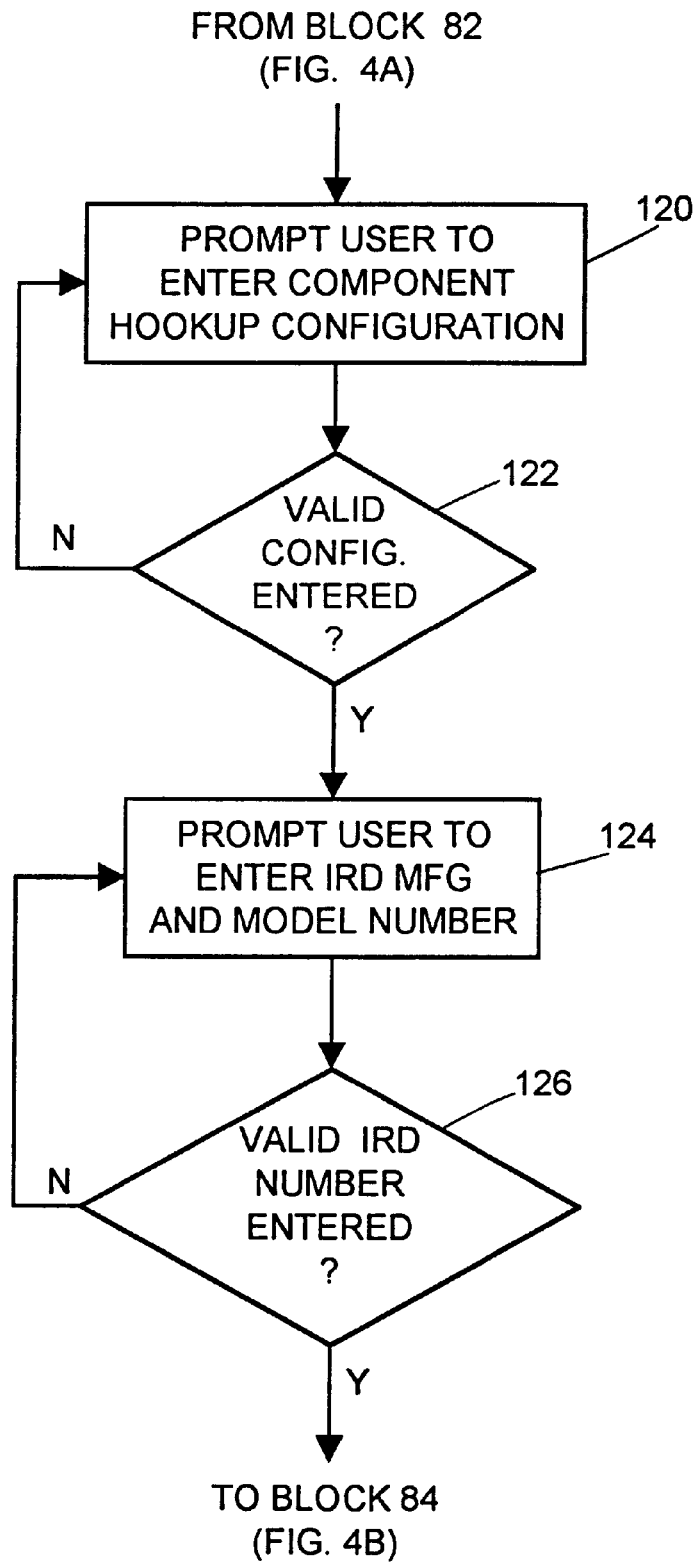
FIG. 5 is a flowchart of optional programming that may be executed by the microcontroller of the remote programmer to automatically purchase pay per view programs.

FIG. 5 is a flowchart illustrating optional programming in the microcontroller 24 of the remote programmer 10 to allow the remote programmer to automatically buy any pay per view programs, rather than having the user manually do an IPPV (impulse pay per view). The programming would begin following a successful test of the VTR 100, as determined by the block 82 of FIG. 4A. A block 120 prompts the user (via display panel 16) to enter their component hookup configuration and a block 122 determines whether such configuration is valid. The component hookup configuration instructs the remote programmer how to switch between VTR, cable, off-air and/or satellite programming. If the block 122 determines that the entered configuration is not valid, control returns to the block 120. Alternatively, a block 124 prompts the user to enter the IRD manufacturer and model number and a block 126 determines whether the entered information is valid. If yes, control returns to the block 84 of FIG. 4B, which prompts the user to begin entering program information.

If the optional programming of FIG. 5 is implemented, the block 94 of FIG. 4B, which prompts a user to prebuy a requested pay per view program may be eliminated. The block 96, however, should still prompt the user to check spending and rating limits. The component hookup and IRD information received by the remote programmer allows the programmer to automatically perform the steps necessary (i.e., give the correct commands to the IRD) to purchase the PPV program. Preferably, the remote programmer would purchase the PPV program a short time (i.e., about five minutes) before the scheduled start time.

If the optional programming of FIG. 5 is implemented to allow automatic purchase of PPV programs, a manufacturer data base (stored in memory of the remote programmer) would have to be upgraded as new IRD manufacturers and models came onto the market. This could be accomplished by installing a dial-out modem in the remote programmer, using a replaceable module that would be sent to the user if they had an IRD which was not included in the master list built-in to the remote programmer, or by automatically downloading the IRD model configuration directly from the IRD into the remote programmer unit. Alternatively, the remote programmer could prompt a user to perform the steps necessary to purchase a PPV program and then store the steps in memory and repeat them whenever necessary to purchase a PPV program.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of appended claims is reserved.

What is claimed is:

1. A remote programmer for programming a satellite television receiver and a video tape recorder to record a selected program, comprising:
   a communication link to the satellite television receiver;
   a communication link to the video tape recorder;
   means for prompting a user to enter programming information for the selected program;
   means responsive to the prompting means for accepting the programming information; and
   means responsive to the accepting means for issuing programming commands to the satellite television receiver and the video tape recorder to cause the selected program to be output from the receiver and recorded by the video tape recorder;
   wherein the communication link to the video tape recorder is an infrared link comprising a plug-in infrared adapter connectable to an infrared transmitter port.

2. A remote programmer for programming a satellite television receiver and a video tape recorder to record a selected program, comprising:
   a communication link to the satellite television receiver;
   a communication link to the video tape recorder;
   means for prompting a user to enter programming information for the selected program;
   means responsive to the prompting means for accepting the programming information;
   means responsive to the accepting means for issuing programming commands to the satellite television receiver and the video tape recorder to cause the selected program to be output from the receiver and recorded by the video tape recorder; and
   means for determining whether the selected program is a pay per view program.

3. A remote programmer for programming a satellite television receiver and a video tape recorder, comprising:
   an interface connecting the remote programmer to the satellite television receiver;
   a processor;
   a display panel;
   a command entry apparatus:
      wherein the processor is programmed to operate the display panel to prompt a user to enter user commands via the command entry apparatus, and to accept user commands specifying a selected program and issue programming commands to the satellite television receiver via the interface to provide the selected program to a receiver output at a specified time; and
   an infrared port linked with the video tape recorder for receiving signals from the processor to cause the video tape recorder to record the selected program;
   wherein the processor is further programmed to determine whether the selected program is a pay per view program.

4. The remote programmer of claim 3, wherein the processor is further programmed to prompt a user via the display panel to pre-buy the selected program and check rating and spending limits if the selected program is a pay per view program.

5. The remote programmer of claim 3, wherein the processor is further programmed to prompt a user to specify satellite television receiver configuration information and automatically purchase the selected program if the selected program is a pay per view program.

6. A remote programmer for programming a satellite television receiver and a video tape recorder, comprising:
   an interface connecting the remote programmer to the satellite television receiver;
   a processor;
   a display panel;
   a command entry apparatus:
      wherein the processor is programmed to operate the display panel to prompt a user to enter user commands via the command entry apparatus, and to accept user commands specifying a selected program and issue programming commands to the satellite television receiver via the interface to provide the selected program to a receiver output at a specified time; and
   an infrared port linked with the video tape recorder for receiving signals from the processor to cause the video tape recorder to record the selected program;
   wherein the processor is further programmed to determine whether the selected program is a satellite program or a local program and, if the selected program is a local program, to send a command to the satellite television receiver to receive local programming.

7. A remote programmer for programming a satellite television receiver and a video tape recorder, comprising:
   an interface connecting the remote programmer to the satellite television receiver;
   a processor;
   a display panel;
   a command entry apparatus:
      wherein the processor is programmed to operate the display panel to prompt a user to enter user commands via the command entry apparatus, and to accept user commands specifying a selected program and issue programming commands to the satellite television receiver via the interface to provide the selected program to a receiver output at a specified time; and
   an infrared port linked with the video tape recorder for receiving signals from the processor to cause the video tape recorder to record the selected program;
   wherein the processor is further programmed to disable control of the satellite television receiver while the selected program is being recorded by the video tape recorder.

* * * * *